(12) United States Patent
Ahtisaari

(10) Patent No.: US 7,581,101 B2
(45) Date of Patent: Aug. 25, 2009

(54) NETWORK INVITATION ARRANGEMENT AND METHOD

(75) Inventor: Marko Ahtisaari, Helsinki (FI)

(73) Assignee: CVON Innovations Ltd., London (GB)

( * ) Notice: Subject to any disclaimer, the term of this patent is extended or adjusted under 35 U.S.C. 154(b) by 0 days.

(21) Appl. No.: 12/079,312

(22) Filed: Mar. 26, 2008

(65) Prior Publication Data

US 2008/0307511 A1    Dec. 11, 2008

Related U.S. Application Data

(60) Provisional application No. 60/921,612, filed on Apr. 3, 2007.

(51) Int. Cl.
*H04L 9/00* (2006.01)
*G06F 21/00* (2006.01)
*G06F 15/16* (2006.01)

(52) U.S. Cl. .......................... 713/171; 726/3; 709/204
(58) Field of Classification Search ................. None
See application file for complete search history.

(56) References Cited

U.S. PATENT DOCUMENTS

| | | | |
|---|---|---|---|
| 6,408,309 B1 | 6/2002 | Agarwal | |
| 7,058,696 B1* | 6/2006 | Phillips et al. | 709/217 |
| 7,136,903 B1* | 11/2006 | Phillips et al. | 709/217 |
| 7,225,342 B2* | 5/2007 | Takao et al. | 713/193 |
| 7,328,343 B2* | 2/2008 | Caronni | 713/171 |
| 7,360,084 B1* | 4/2008 | Hardjono | 713/163 |
| 2002/0006803 A1 | 1/2002 | Mendiola et al. | |
| 2002/0019829 A1 | 2/2002 | Shapiro | |
| 2002/0075305 A1 | 6/2002 | Beaton et al. | |
| 2003/0126015 A1 | 7/2003 | Chan et al. | |
| 2004/0186789 A1* | 9/2004 | Nakashima | 705/26 |
| 2004/0209649 A1 | 10/2004 | Lord | |
| 2005/0018853 A1* | 1/2005 | Lain et al. | 380/277 |
| 2005/0138369 A1* | 6/2005 | Lebovitz et al. | 713/163 |

(Continued)

FOREIGN PATENT DOCUMENTS

BE    1015704    7/2005

(Continued)

OTHER PUBLICATIONS

Baugher et al, "The Secure Real-Time Transport Protocol (SRTP)", Mar. 2004, Network Working Group Request For Comments: 3711, p. 1-53.*

(Continued)

*Primary Examiner*—Christopher A Revak
(74) *Attorney, Agent, or Firm*—Frishauf, Holtz, Goodman & Chick, P.C.; Robert P. Michal

(57) ABSTRACT

Method and arrangement for enabling communications between an entity operating a network including a first user, and a second user includes sending a message from the first user to the entity informing the entity of identification information of the second user interested in joining the network, sending from the entity to the first user a key to allow the second user to communicate with the entity, providing a message from the first user directly to the second user containing the key, sending a message from the second user to the entity using the key, determining whether the key sent by the second user corresponds to the key provided by the entity to the first user, and if so enabling communications between the second user and the entity. The ability of the first user to obtain a key to enable the second user to join the network is time-limited.

148 Claims, 6 Drawing Sheets

U.S. PATENT DOCUMENTS

| | | |
|---|---|---|
| 2005/0228680 A1 | 10/2005 | Malik |
| 2005/0239504 A1 | 10/2005 | Ishii et al. |
| 2005/0273465 A1 | 12/2005 | Kimura |
| 2006/0048059 A1 | 3/2006 | Etkin |
| 2006/0068845 A1 | 3/2006 | Muller et al. |
| 2006/0106936 A1* | 5/2006 | De Luca et al. ............ 709/228 |
| 2006/0117378 A1 | 6/2006 | Tam et al. |
| 2007/0003064 A1* | 1/2007 | Wiseman et al. ........... 380/281 |
| 2007/0055439 A1* | 3/2007 | Denker et al. .............. 701/200 |
| 2007/0055440 A1* | 3/2007 | Denker et al. .............. 701/200 |
| 2007/0061568 A1* | 3/2007 | Lee et al. ................... 713/163 |
| 2007/0106899 A1* | 5/2007 | Suzuki ....................... 713/175 |
| 2007/0204061 A1* | 8/2007 | Chen et al. ................. 709/238 |
| 2008/0057917 A1 | 3/2008 | Oria |
| 2008/0123856 A1* | 5/2008 | Won et al. .................. 380/277 |
| 2008/0130547 A1* | 6/2008 | Won et al. .................. 370/312 |
| 2008/0301303 A1* | 12/2008 | Matsuoka .................. 709/227 |

FOREIGN PATENT DOCUMENTS

| | | |
|---|---|---|
| EP | 1 280 087 A1 | 1/2003 |
| EP | 1 320 214 A1 | 6/2003 |
| EP | 1 528 827 A2 | 5/2005 |
| EP | 1 772 822 A1 | 4/2007 |
| GB | 2 372 867 A | 9/2002 |
| WO | WO 01/44977 A2 | 6/2001 |
| WO | WO 01/63423 A1 | 8/2001 |
| WO | WO 02/44989 A2 | 6/2002 |
| WO | WO 02/096056 A2 | 11/2002 |
| WO | WO 2004/100470 A1 | 11/2004 |
| WO | WO 2005/073863 A1 | 8/2005 |
| WO | WO 2006/024003 A1 | 3/2006 |
| WO | WO 2007/002025 A2 | 1/2007 |
| WO | WO 2007/060451 A2 | 5/2007 |
| WO | WO 2007/091089 A1 | 8/2007 |

OTHER PUBLICATIONS

Schulzrinne et al, "RTP: A Transport Protocol For Real-Time Applications", Jul. 2003, Network Working Group Request For Comments: 3550, p. 1-98.*

Wallner et al, "Key Management for Multicast: Issues and Architectures", Jun. 1999, Network Working Group Request for Comments: 2627, p. 1-22.*

United Kingdom Search Report under Section 17 dated Oct. 24, 2007 in connection with GB 0712281.5 (2 pages).

PCT International Search Report (Form PCT/ISA/210) mailed Jul. 4, 2008 issued in corresponding International Application PCT/EP2008/052678.

Official Action from the European Patent Office dated Apr. 1, 2009, in connection with the corresponding European Application No. 08 717 428.0 (4 Pages).

Official Action From the British Intellectual Property Office dated Oct. 9, 2008, in connection with the corresponding British Application No. GB0712281.5 (5 Pages).

* cited by examiner

PRIOR ART

PRIOR ART

NETWORK INVITATION ARRANGEMENT AND METHOD

CROSS-REFERENCE TO RELATED APPLICATIONS

This application claims the benefit under 35 USC 119 of the filing dates of U.S. Provisional Patent Application Ser. No. 60/921,612 filed Apr. 3, 2007 and GB Application No. Jun. 22, 2007, the entire contents of each of which are incorporated herein by reference.

FIELD OF THE INVENTION

The present invention relates generally to a method and arrangement for extending invitations from members of a network or community to non-members to solicit the non-members to join the network or community.

The present invention also relates generally to a method and arrangement for conducting a marketing campaign in which participants directly contact non-participants to thereby expand the marketing campaign.

BACKGROUND OF THE INVENTION

Virtual communities are becoming increasingly important vehicles for intense communication and dissemination of new ideas in the online world. Some examples of virtual communities include a community formed as a group of mobile telephone numbers of close friends engaging in instant messaging, often referred to as a "buddy list", a community formed as a group of e-mail addresses in e-mail applications and a community formed as a group of participants or members of an Internet chat room. Relationships arising between members of these communities form so-called social networks.

Today, virtual communities are used not only to voluntarily develop and discuss ideas within specific interest groups but also are of increasing value for a commercial advertiser to conduct an effective marketing campaign. In essence, virtual communities offer "word-of-mouth" marketing from one member of the community to another and can also constitute endorsement networks whereby one member endorses a product or services causing another member to purchase that product or service. In fact, virtual communities are increasingly being perceived as one of the strongest marketing techniques currently available.

Most online applications also utilize in their marketing campaigns, whether consciously or unconsciously, viral effects generated within and between social networks. Specifically, creation and expansion of virtual communities can be carried out using viral marketing techniques to allow existing members of these communities to recommend or invite new members into their community.

However, expansion of virtual communities using viral marketing can lead to uncontrolled membership growth and misusage of the virtual communities. This is particularly problematic in cases where the members of the virtual community are provided with valuable benefits such as free electronic mail, free videos, discounts to stores, free voice communication to mobile devices, free text messaging, discount in communication, free stuff in stores, etc.

Another concern of maintaining a virtual community is determining the proper balance of the community vis-à-vis a limit on the number of invitations a member of the community can extend to non-members to join the community. Allowing a member of the community with only few friends to extend ten invitations to join the community does not provide a significant increase in the value of the virtual community but may rather cause the virtual community service to appear overly restrictive. On the other hand, for a member with a large network of friends who would be a good fit for the virtual community, the possibility of extending only ten invitations would diminish that member's likelihood of actively participating in the virtual community and squander a good opportunity to significantly increase the value of the virtual community.

In light of this dilemma, a common technique to control expansion of a virtual community is to grant members of the virtual community a limited number of invitations they can extend with the number of invitations dependent on the member.

For example, members of Google's Gmail virtual community could initially extend only three invitations to non-members to join their community. However, members who satisfy certain criteria set by Google, based for example on activity, could be provided with the ability to extend more invitations. FIGS. 6A and 6B show examples with an active member being provided with a larger number of invitations (FIG. 6A) than a less active member (FIG. 6B).

FIG. 7 shows a prior art technique for extending invitations from one member of a virtual community to a non-member to join the virtual community. Initially, a first user of the communications network which enables access to the virtual community and who is a member of the virtual community, A-user 1, directs an invitation server 3 which manages the virtual community to invite a second user, B-user 2, to join the virtual community, e.g., by sending a message S1 to the invitation server 3 such as "Invite B to service". The invitation server 3 includes a computer software program to check whether A-user 1 is authorized to invite a user to the service, i.e., to join the virtual community. If A-user 1 is so authorized, then the invitation server 3 sends a message S2 to B-user 2, for example, "you are invited to join service". The message typically contains a unique key or URL for B-user 2 to use when registering with the service. B-user 2 returns the key in a message S3 to the invitation server 3 and the invitation server 3 then grants service for B-user 2, i.e., allows B-user 2 to join the virtual community by sending a message S4 to this effect. In this invitation process, direct contact between A-user 1 and B-user 2 is not required.

Similar arrangements are typically used also in some web-based marketing campaigns to solicit, or direct advertising material to, non-participants based on a referral from a participant. In this case, a first participant in the marketing campaign connects to a web server/service and provides an e-mail address or other contact information for a second, non-participant to receive marketing material. The server sends an e-mail or other message (regular mail, sms, mms) to the second non-participant. In this arrangement, the second non-participant typically receives a message from the server indicating it has been sent by an unknown party, i.e., the second non-participant is not advised that the marketing material was sent at the request of the first participant. This may results in the message being classified as junk or trash mail so that the second non-participant does not review the marketing material. The purpose of the marketing campaign has thus been frustrated.

SUMMARY OF THE INVENTION

Disclosed herein are a method and arrangement for formulating invitations from a member of a community to a non-member to maximize the possibility that the non-member receives and reviews the invitation. Also disclosed herein are a method and arrangement for managing invitations to join virtual or non-virtual communities in which a member of the community is permitted to extend a relatively large number or even an unlimited number of invitations to non-members to join the community; however, the invitation period in which a member can extend an invitation is limited to a particular time, but this time period may vary between the members.

Also disclosed herein are a method and arrangement for optimizing virtual community-based marketing or advertising campaigns, whereby a participant in the marketing campaign forwards marketing material to a non-participant who receives the message with an indication that the sender is the participant and not a third party unknown to the recipient. This therefore reduces if not eliminates the likelihood of the marketing material being considered spam, junk or trash mail and thus increases the likelihood of the non-participant reviewing the marketing material.

In accordance with a first exemplary embodiment of the invention, a method for enabling communications between an entity with which a first user is communicating and a second user includes sending a message from the first user to the entity informing the entity of identification information of the second user, sending from the entity to the first user a key to allow the second user to communicate with the entity, thereafter providing the key from the first user directly to the second user, thereafter sending a message from the second user to the entity using the key, thereafter determining whether the key sent by the second user corresponds to the key provided by the entity to the first user, and if so enabling communications between the second user and the entity. In one exemplary embodiment of the invention, an arrangement for enabling communications between an entity with which a first user is communicating and a second user includes means maintained by the first user for sending a message to the entity informing the entity of identification information of the second user, means maintained by the entity for sending to the first user a message containing a key to allow the second user to communicate with the entity, and means maintained by the second user for sending a message to the entity using the key. The means maintained by the first user are arranged to send a message directly to the second user containing the key after receiving this message from the means maintained by the entity. The means maintained by the entity are arranged to determine whether the message sent by the second user is being sent using the same key provided by the entity and if so enable communications between the second user and the entity.

BRIEF DESCRIPTION OF THE DRAWINGS

The invention, together with further advantages thereof, may best be understood by reference to the following description taken in conjunction with the accompanying drawings, wherein like reference numerals identify like elements, and wherein.

DETAILED DESCRIPTION OF THE INVENTION

Figure 1:
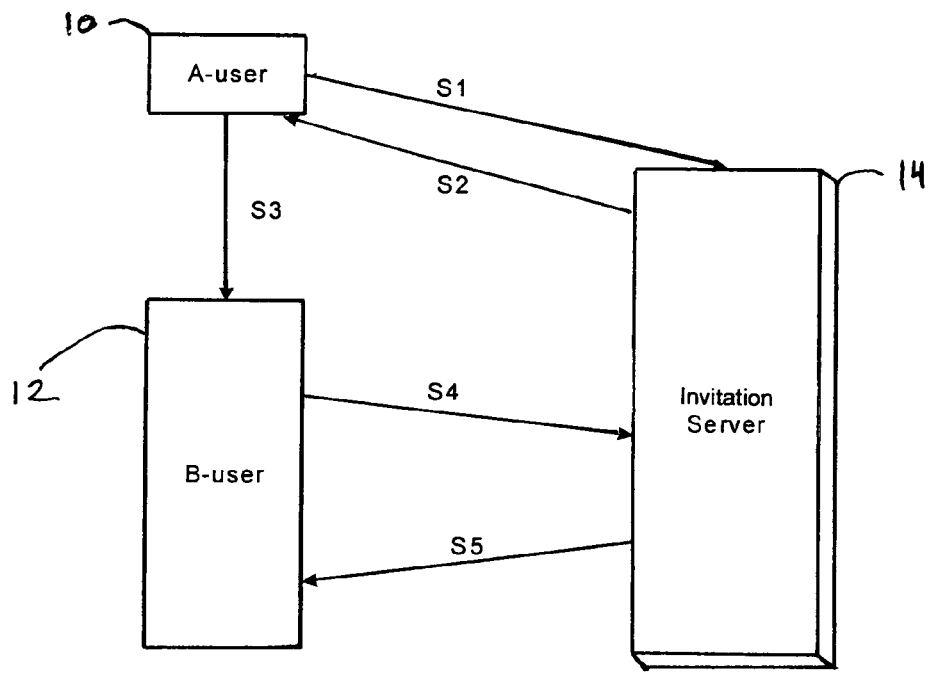
FIG. 1 is a flow diagram of an exemplary arrangement and method for extending an invitation from one user of a network to another user of the network in accordance with the invention.

Referring to the accompanying drawings wherein the same reference numerals refer to the same or similar elements, FIG. 1 is a flow diagram of an exemplary arrangement and method for extending an invitation from one user of a network to another user of the network. For example, the network can be a virtual community wherein the arrangement and method in accordance with the invention relate to the manner in which a member of the community can extend an invitation to join the community to a non-member. In another example, the network is any communications network wherein the arrangement and method are used to extend an invitation from a participant in a marketing or advertising campaign to a non-participant so that the non-participant will receive advertising material relating to products or services which are the subject of the marketing or advertising campaign. Other situations wherein a member or participant in a program desires to invite a non-member or non-participant to join the program are also envisioned to be within the scope of the arrangement and method in accordance with the invention. Accordingly, hereinafter, the arrangement and method will be considered to relate to any invitation process, whether the invitee is being invited to apply to join, accept an invitation to or join a virtual community or purchase goods or services as a result of a marketing campaign. However, the following description relates primarily for extending an invitation from a current member of a service network (mobile service) to a potential new member.

Referring to FIG. 1, a first user 10 is a participant in the mobile service and is assigned a subscriber indicator A, while a second user 12 is not a participant in the mobile service and is assigned a subscriber indicator B. Both the first and second users may be users of the same mobile communications service (e.g., mobile phone network) or users of different mobile communication services, or either the first or the second user (or both) is not a user of any mobile communication service. However, in the following, both users are assumed to users of the same network, e.g., a communications network in this case. The first user 10 may have become a participant in the mobile service by joining offline, i.e., at a physical location maintained by the mobile service, such as a booth.

The users preferably have mobile devices with communication capabilities such as text messaging, picture messaging, Short Message Service (SMS), Multimedia Message Service (MMS), electronic mail, Wireless Application Protocol (WAP) browsing, World Wide Web (WEB) browsing, voice, audio and video communications. It is recognized that not all mobile devices have the aforementioned communication capabilities, and that the communication capabilities of each user's mobile device can vary and the specific communication capabilities of each mobile device will not limit the scope of the invention. The mobile devices can be mobile telephones, multimedia computers, personal data assistants (PDAs), laptop computers, etc. Note that the invention is not limited to use with mobile devices but can be also used in personal computers. Further, the arrangement and method in accordance with the invention can be used to invite others to participate in a service which is virtual, on-line, or mobile, or to invite others to join another type of service or community. The arrangement and method are also not limited to online, mobile or virtual communities but can be used, for example, for real communities.

Initially, the A-user 10 wants to invite B-user 12 to participate in the service, and directs a message S1 indicating this desire to an entity controlling the invitation procedure in accordance with the invention, namely, an invitation server 14. The form of the message S1 may be freely determined by A-user 10 or set by the invitation server 14.

The message S1 may include information about the prospective invitee, B-user 12. For a mobile environment, this information is preferably the subscriber number, MSISDN (Mobile Subscriber Integrated Services Digital Network) number (i.e. the phone number) or IMEI (International Mobile Equipment Identity) code of B-user 12. For an Internet-based service, the information would preferably be B-user's e-mail address.

However, the invention is not intended to be limited to these examples and other information about the prospective invitee, corresponding to the specific communication environment can be included in message S1.

In one embodiment, invitation server 14 includes a computer program which analyzes the incoming message S1 from A-user 10 and determines whether A-user 10 is authorized to extend an invitation to others to apply to join, join or accept an invitation to the mobile service. The parameters controlling each member's ability to extend an invitation are set by the operator of the invitation server 14 and effectuated via the computer program. The parameters may include the member's invitation history, i.e., the number of invitations previously extended and the number of active members who joined as a result of such invitations, the time that A-user 10 has used the mobile service and the manner in which A-user 10 uses the mobile service.

By controlling the members' ability to extend invitations, growth or expansion of the network can be restricted. This control may be necessitated by, for example, the amount of advertisers covering operating expenses of the network, the availability of SIM-cards for all new users and/or a desire to maintain adequate delivery times for SIM-cards to new users.

However, it is conceivable that the number of invitations that can be extended by members is indefinite, i.e., a limit on the number of invitations is not required. Also, depending on the availability of advertisers, a fee could be imposed for delivery of SIM-cards to new members which might also serve to restrict growth.

In one embodiment, another way to restrict growth or expansion of the network would be to require an invitation to the network. In this case, a non-member without an invitation from a member or arising from an invitation campaign would not be permitted to apply to join or join the network.

If A-User 10 is not authorized to extend an invitation at the time of his or her request, the invitation server 14 could send an information message notifying A-User 10 that currently A-User 10 cannot invite new members. However, information about this request from A-User 10 could be stored in a database associated with the invitation server 14 so that once A-User 10 is able to extend an invitation (upon passage of a period of time or satisfaction of other criteria), the invitation server 10 duly notifies A-User 10 to enable A-User 10 to proceed with the process of extending an invitation to B-User 12. The formation of such a waiting list is advantageous in that it creates a pool of potential members.

In this regard, the presence of the database can be used to initiate membership campaigns when desired whereby each campaign could involve enabling requests stored in the database, this may be referred to as triggering an invitation campaign. That is, the database may be monitored and when it is desired to conduct a membership campaign, the data in the database is used to send messages to members indicating they are now permitted to extend invitations.

If A-user 10 is authorized to extend an invitation, then the invitation server 14 transmits a message S2 to A-user 10 including an access key with instructions as to how to extend an invitation to B-user 12 to participate in the service. At this stage, there is no communication between the invitation server 14 and the mobile device of B-user 12.

In one embodiment, message S2 would also include a time period in which A-User 10 can extend the invitation to B-User 12. This time period can be determined in various ways. One way is for the operator of the service to set the same time period for every member or group of members to extend an invitation when a response to a request for an invitation is provided. Another way is to vary the time period as a function of whether the member requesting an invitation has previously sent invitations to non-members who have joined and have a particular profile. A predetermined time period would be initially set, such as one day, and then adjusted based on whether the requesting member has sent invitations to others who have joined and their profile. For example, a member who sent an invitation to a non-member who joined and has a desirable profile might be allotted two days within which to extend an invitation, and a member who sent an invitation to a non-member who did not join or who joined but did not have a desirable profile might be allotted only twelve hours (½ day).

A reward of sorts is therefore provided to the member based on responses to previously extended invitations, this reward being an extended period of time within which an invitation to another non-member can be extended. Other forms of rewards can also be provided to the members. These rewards may also be based on a member's invitation history which can be monitored by the invitation server 14.

The access key or invitation key can take various forms. In one embodiment, the access key is an access code which is required for B-user 12 to initiate participation in and use the service. The access code may be a unique, rolling code. In another form, an access code is not used but rather, the access key is a telephone number created and used so that only a call from B-user 12 to this specific telephone number is required to allow B-user 12 to participate in and use the service. This embodiment is discussed below.

When the access key is an access code, once the A-user 10 receives the access code and instructions from the invitation server 14, A-user 10 communicates with B-user 12 to provide the access code, e.g., sends a message S3 to B-user 12. The manner in which A-user 10 communicates with B-user 12 to provide the access code may be in accordance with the instructions received from the invitation server 14 or in any other manner. For example, the communication from A-user 10 to B-user 12 may be by sending a short message service message (SMS-message) to B-user 12 including the access code, sending instructions using e-mail with the access code, calling B-user 10 and telling that individual the access code, sending the access code in a letter, and showing B-user 12 the access code directly from a screen of A-user's mobile device, among others.

Figure 7:
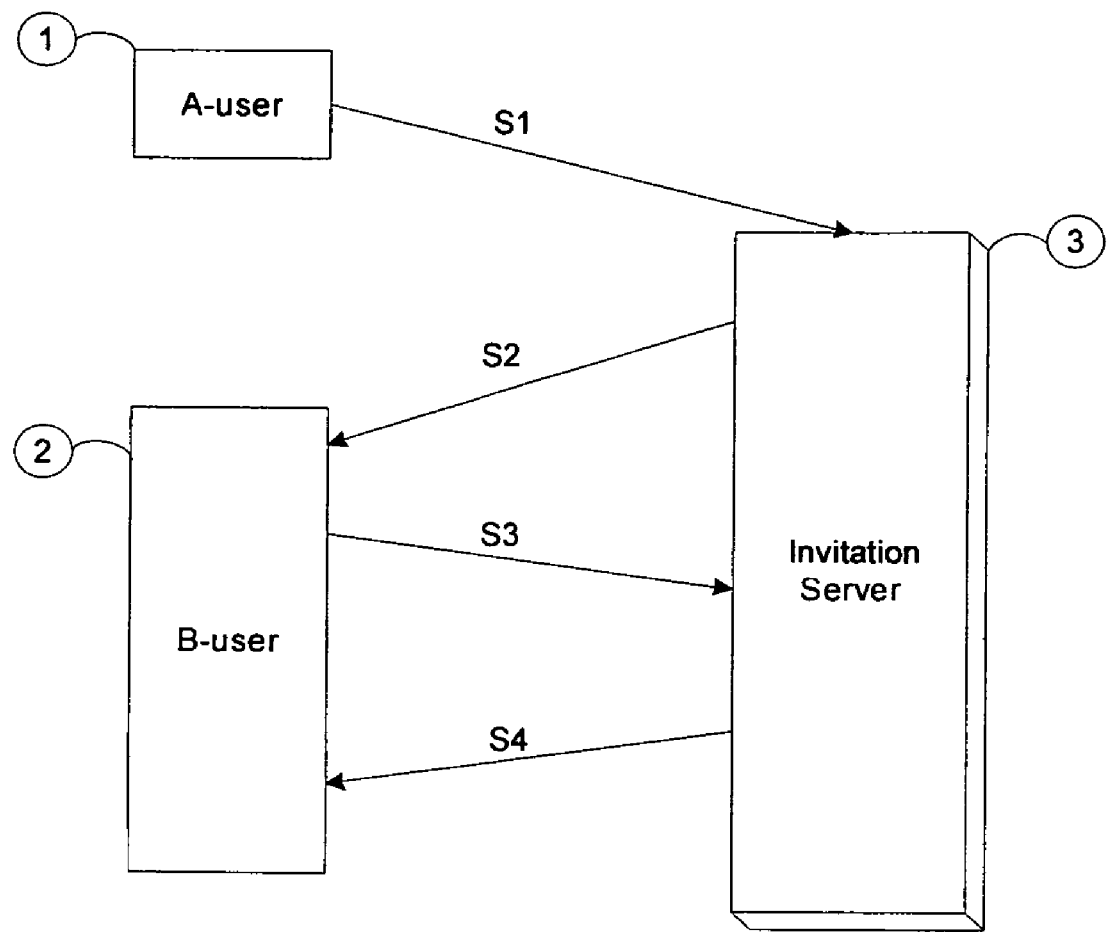
FIG. 7 is a flow diagram of a prior art system and method for extending an invitation from one user of a network to another user of the network.

Since the access code comes directly from A-user 10, the likelihood of B-user 12 considering the message S3 including the access code as spam, junk or trash mail is significantly reduced in comparison to a prior art scenario where an invitation comes directly from an unknown third party (see the discussion of FIG. 7 above). In addition, since A-user 10 provides the access code to B-user 12, A-user 10 is likely to provide explanations on what to do with the access code, i.e., how to join and use the service, thereby decreasing the need for B-user 12 to obtain assistance from a service center, which provides assistance to use the service. Moreover, A-user 10 is also likely to explain the benefits of the service which would likely be given great weight by B-user 12, thereby increasing the likelihood of B-user 12 starting to use the offered service, product etc.

After B-user 12 receives the message S3 containing the access code directly from A-user 10, B-user 12 sends a message S4 with the access code to the invitation server 14.

The invitation server 14 checks the access code and compares it with a database of available codes. The invitation server 14 would typically include a computer software program which generates access codes to be provided to members seeking to invite others and checks incoming codes from non-members to verify that they correspond to previously generated and disseminated codes.

In the event that message S4 from B-User 12 comes into the invitation server 14 at the same time as a significant number of messages from others responding to similar invitations, the invitation server 14 can be configured to send return messages S5 at a slower rate or inform B-User 12, and/or some of the other responders, that the system is experiencing a higher than normal load and that they should resend their messages at a later time.

Another issue that may arise is if B-User 12 is joined by a significant number of potential members which, if everyone were to be approved and processed for membership, would overwhelm the service. In this case, a waiting list of non-members that responded to invitations within the allotted time period but were unable to apply to join or join the service can be created and stored in a database. When the service is later ready to accept additional members, it would automatically contact these subscribers on the waiting list and advise them of the possibility to apply to join or join the service.

In the event that message S1 from A-User 1=comes into the invitation server 14 at the same time as a significant number of messages from others initiating similar invitation process, the invitation server 14 can be configured to send return messages S2 at a slower rate or inform A-User 10, and/or some of the other invite initiators, that the system is experiencing a higher than normal load and that they should resend their messages at a later time.

In one exemplary embodiment, the invitation server 14 includes a computer software program which performs a check to determine whether the access code actually originates from B-user 12, i.e., a validation procedure. To enable such a validation procedure, the access code being generated for B-user 12 based on the information provided by A-user 10 about B-user 12 may be exclusive to B-user 12. If not, the invitation server 14 can be designed to prevent participation in and use of the service by the unauthorized user attempting to use the access code for B-user 12.

If the access code provided by B-user 12 is in the invitation server's database (and message S4 originates with B-user 12 if this validation is in effect), the computer software program in the invitation server 14 authorizes B-user 12 to use the service and sends B-user 12 a message S5 to this effect, which message might also include additional information or software necessary to use the service. B-user 12 has now become a member of the service, i.e., a participant in the mobile service, based on the referral from A-user 10.

Figure 2:
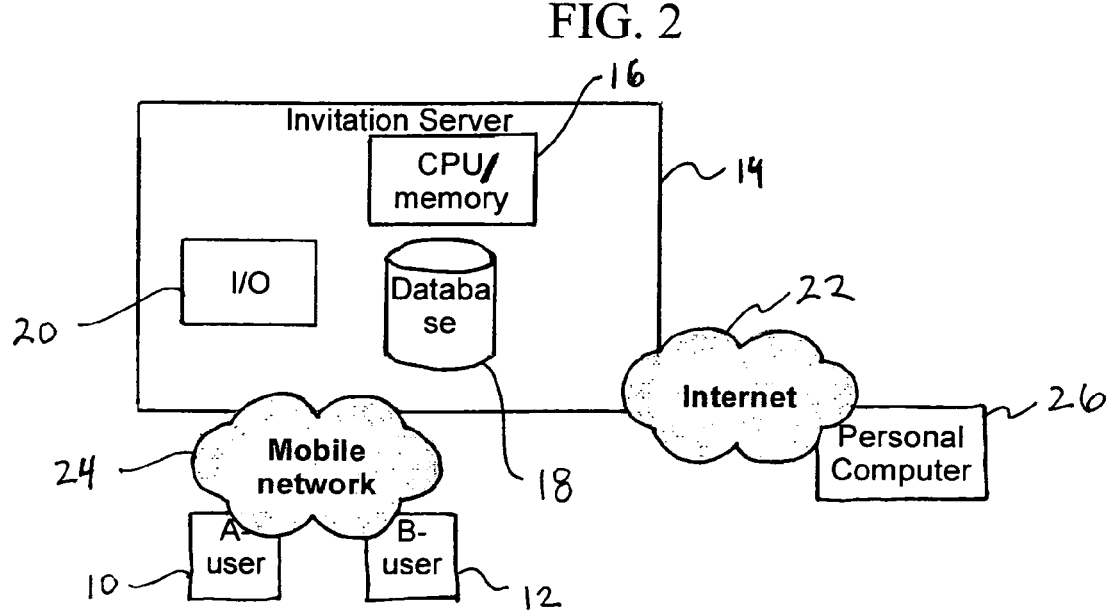
FIG. 2 is a schematic of an exemplary invitation server used in an arrangement and method in accordance with the invention.

Referring now to FIG. 2, a detailed description of the invitation server 14 used in a mobile domain example is provided. Invitation server 14 includes a processing component such as a central processing unit (CPU) 16 and memory associated therewith. This memory may have one or more embedded computer programs or is provided with one or more computer programs needed to effectuate the invitation procedure described herein. Invitation server 14 also includes one or more databases 18 and one or more input/output devices 20 for communicating with external servers, communication or other networks and the like. The invitation server 14 can also be connected to the Internet 22 and/or a mobile network 24, with other devices being connected to the invitation server 14 via the Internet 22, e.g., a personal computer 26. The mobile network 24 can be connected directly to the invitation server 14 (as shown) or indirectly to the invitation server 14 via the Internet 22.

Applying the example of A-user 10 inviting B-user 12 to use a mobile service described above with reference to FIG. 1 in the arrangement shown in FIG. 2, the A-user 10 could send a SMS message to the invitation server 14 using the mobile network 24. As the SMS message is delivered to the invitation server 14 via the mobile network 24, the subscriber number of A-user 10 is also delivered to the invitation server 14. A computer software program resident in the CPU 16 checks whether A-user's subscriber number is valid for inviting another user to use the service and that the invitation process is initiated during an allowed invitation period (time period) for A-user 10. If both of these conditions are satisfied, then the invitation server 14 provides instructions to A-user 10 to invite B-user 12 to use the service. Instructions may be provided by the invitation server 14 to A-user 10 using either the same mobile network 22 as was used to send a message from A-user 10 to the invitation server 14 or a different network or message transmission mode.

As an example of the type of instructions that may be provided by the invitation server 14 to A-user 10 to enable B-user 12 to join the service, the instructions may be an access code which B-user 12 has to send to the invitation server 14 using the SMS messaging. In an embodiment wherein A-user 10 must provide B-user's subscriber number to the invitation server 14, when B-user 12 subsequently sends the SMS message to the invitation server 14 with the access code, the invitation server 14 may be programmed to ascertain that B-user's subscriber number corresponds to that provided by A-user 10 and that the access code is correct. This correspondence may be checked by creating a database in the invitation server 14 of the subscriber numbers of invitees and access codes provided for those invitees. If both of the conditions are satisfied, the invitation server 14 grants access to B-user 12 to participate in and use the service. Access may be granted by sending a message to B-user 12 indicating acceptance to join the service.

As mentioned above, in one exemplary embodiment of the invention, an access code is not used to enable B-user 12 to be authorized to join the service. Rather, A-user 10 provides a subscriber number of B-user to the invitation server 14 and invitation server 14 instructs A-user 10 to communicate with B-user 12 and provide a specific, predetermined manner in which B-user 12 can communicate with the invitation server 14, e.g., a specific number to call to contact the invitation server 14 or a specific message to provide to the invitation server 14. Reception of thus specific call or message from B-user 12, i.e., from a mobile phone having B-user's subscriber number, allows the invitation server 14 to grant access to B-user 12 to participate in and use the service since the subscriber number associated with the call or message would correspond to that provided by A-user 10 to the invitation server 14.

Figure 3:
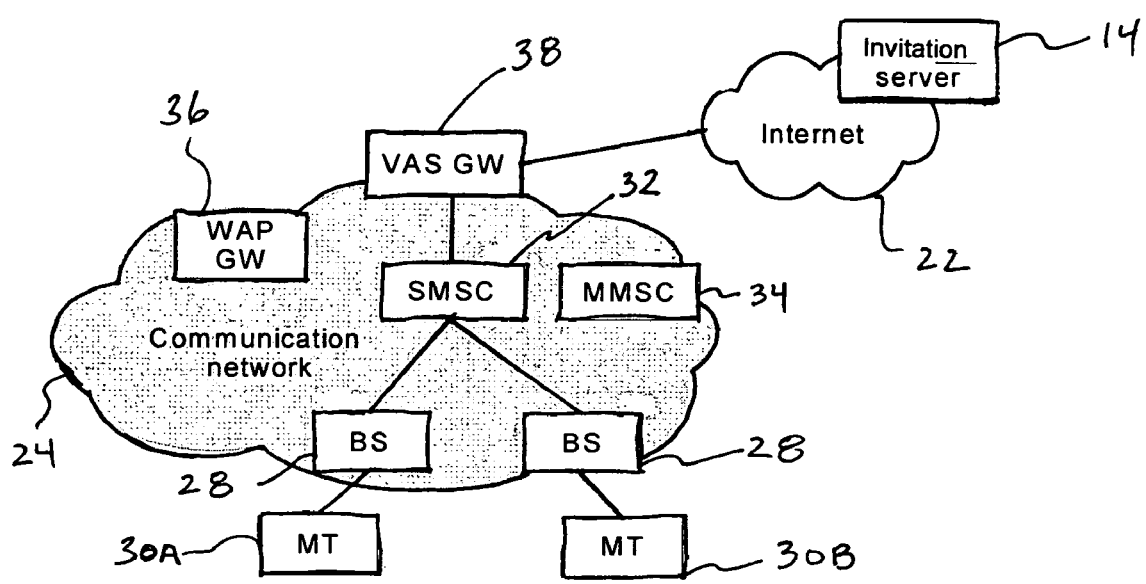
FIG. 3 shows an example of how a short message service is integrated into an arrangement and method in accordance with the invention.

Referring now to FIG. 3, an example of how a SMS message is integrated into an arrangement and method in accordance with the invention is shown. The invitation server 14 communicates with the mobile network 24 via the Internet 22. The mobile network 24 can be any type of cellular communications network including but not limited to a second Generation (2G) network, a 2.5 Generation network, a third Generation (3G) network utilizing Global System for Mobile Communications (GSM), Wideband Code Division Multiplex Access (WCDMA), Code Division Multiplex Access (CDMA), or Time Division Multiplex Access (TDMA), and a network using Wireless Local Area Networks (WLAN), WiMax or other access technologies or combination of several technologies forming hybrid network structures.

As shown in FIG. 3, in an exemplary mobile network 24, there are common network elements such as Base Stations (BS) 28 for providing wireless access to mobile terminals 30A and 30B, a short message service center (SMSC) 32, a multimedia service center (MMSC) 34, a Wireless Application Protocol GateWay (WAP GW) 36, and a Value Added Service Gateway (VAS GW) 38. As shown, the VAS GW 38 is connected to the Internet 22. A-User 10 would be using mobile terminal 30A and B-User 12 would be using mobile terminal 30B. Mobile network can also include elements (not shown in the figure) such as GGSN (Gateway GPRS (General Packet Radio Service) Support Node), Internet access points etc for providing access to Internet for the mobile devices.

Applying the invitation procedure described above with reference to FIG. 1, when A-user 10 sends a SMS message containing the subscriber phone number of B-user 12 (S1 in FIG. 1) to initiate an invitation to B-user 12 to use the service, the SMS is routed via the SMSC 32 to the VAS GW 38. The information from the SMSC 32 contains the subscriber number of A-user 10 and the actual message from A-user 10 to be provided to B-user 12, i.e., a message about the service. The VAS GW 38 composes a message containing the SMS message and sends that via the Internet 22 to the invitation server 14. The VAS GW 38 stores information on B-user's subscriber number, an access code to be used by B-user 12 to enable access to the service and A-user's subscriber number in a database associated therewith. Sending of any of the messages described above can be done via e-mail, using an HTTP type of connection, or any other suitable means of communication.

In one exemplary embodiment, the invitation server 14 uses B-user's subscriber number to generate a unique access code to enable B-user 12 to use the service, this access code being sent from the invitation server 14 to the VAS GW 38. The VAS GW 38 returns the access code to A-user 10, e.g., in a message (S2 in FIG. 1).

After A-user 10 receives the message S2 including the access code, he or she sends, shows or otherwise provides the access code to B-user 12. A-user 10 can also provide, in the same message with the access code (S3 in FIG. 1), instructions for B-user 12 to access the service or possibly comments about the service. B-user 12 can send the access code in a message (S4 in FIG. 1) to the invitation server 14 using SMS messaging. The access code is routed via the SMSC 32 to the VAS GW 38. The VAS GW 38 analyzes the message and sender, i.e., the sender's subscriber number. Since the sender's subscriber number corresponds to a sender provided with an appropriate code, the VAS GW 38 sends an acknowledgement message to the invitation server 14 for B-user 12 (S5 in FIG. 1) indicating that the invitation server 14 has granted use of the service to B-user 12.

The VAS GW 38 and invitation server 14 can be resident in separate servers as depicted in FIG. 3, or alternatively, can be resident in the same server.

An alternative transmission path of messages can be performed using the WAP GW 36 of the mobile network 22. The WAP GW 36 can forward information about B-user's subscriber number to the invitation server 14 and the subscriber number information can be used to verify that the actual sender of the access code is the expected sender of the access code (through comparison to the information provided by A-user 10 when seeking to invite B-user 12 to join the service). The users may use a WAP browser of the mobile phone.

The user's mobile phones can connect via an Internet access point (not shown) directly to the invitation server 14 using a web browser of the phone.

Figure 4A:
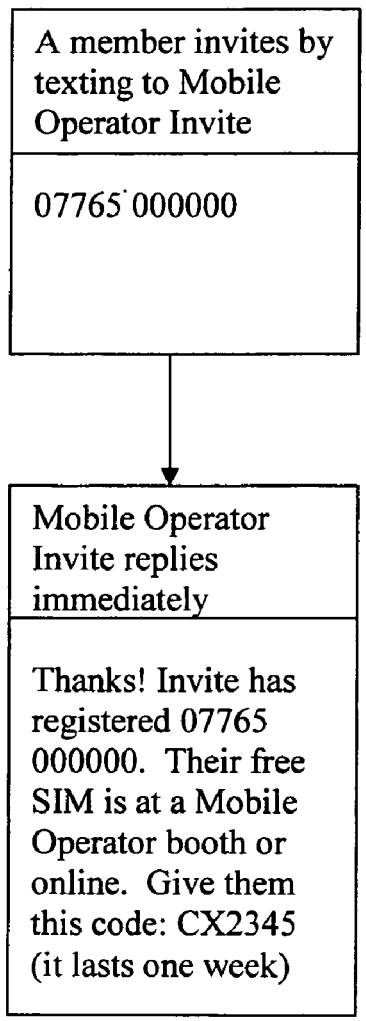
FIGS. 4A and 4B show examples of the flow of a user interface for a member of a mobile telephone service seeking to invite a non-member to use the service.
Figure 4B:
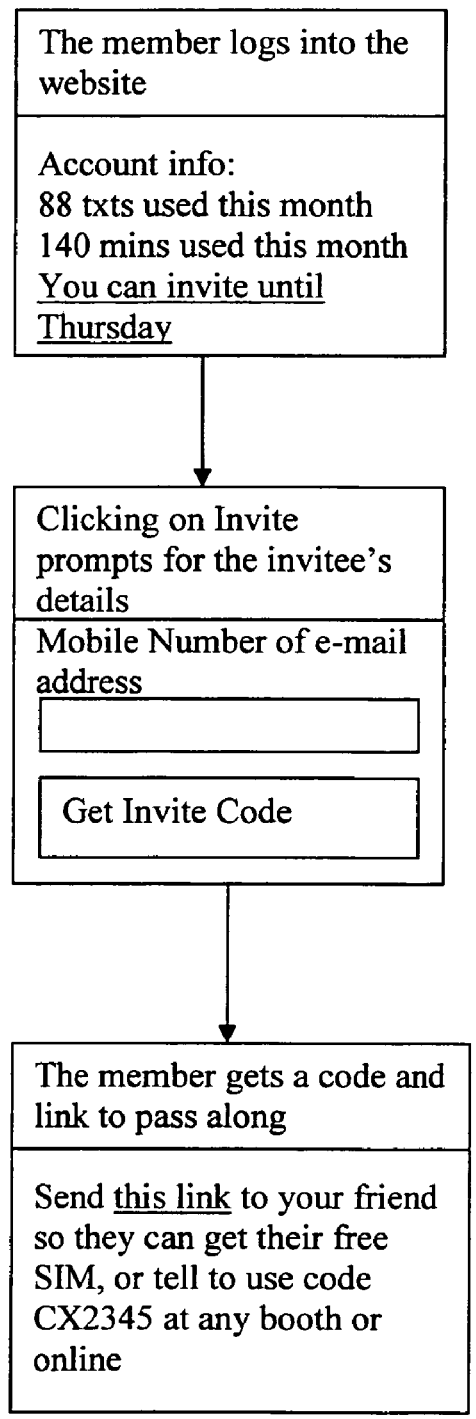

FIGS. 4A and 4B show examples of the flow of a user interface for a member seeking to invite someone to use the service. FIG. 4A shows the user interface for a mobile phone service, namely operator "Mobile Operator", wherein the member seeks to invite someone to subscribe to the mobile phone service using the mobile phone. The member texts a message to the invitation server of the mobile service, Mobile Operator Invite, using any known text messaging protocol, providing the potential subscriber's mobile phone number, such as 07765 000000. Mobile Operator Invite replies to the text message indicating that the operator of the mobile service has registered the potential subscriber's phone number and assigned an access code, CX2345, to the potential subscriber. The member is also notified that Mobile Operator Invite has registered the potential subscriber and that the member should notify the potential subscriber directly that a free SIM (Subscriber Identity Module) is available to the potential subscriber at one of the operator's booths or online. Further, the member is instructed to provide the access code to the potential subscriber, and that the invitation is time-limited, for example, for only one week.

FIG. 4B shows a user interface for the same mobile phone service wherein the member seeks to invite someone to subscribe to the mobile phone service using the Internet. Web pages displayed on the mobile phone may be "normal" web pages or WAP pages. The member logs into a website associated with the mobile service and, after possible introductory member data entry and confirmation, is presented with account information. Account information may include the number of text messages used in the current month, and the number of minutes of voice communications used in the current month. An indication, i.e., a link, is also provided as to whether the member can invite others to subscribe to the mobile service. Clicking on the link prompts for the invitee's contact details, namely, their mobile phone number, and once the phone number is entered by the member, they proceed to obtain an invitation or access code by clicking a designated area, such as one marked "Get Invite Code". Then, the member is provided with an access code and a link to pass along directly to the potential subscriber. The message to the member may be to send an embedded link and the access code with an indication that the potential subscriber can receive a free SIM once they click on the link or use the access code at the operator's booth or online.

In the example of the user interface in which a member extends an invitation via a mobile phone, in one exemplary embodiment there is a time limit as to when the potential subscriber can accept the invitation. Determination of appropriate time windows for each member prevents unlimited expansion of the number of members in the service. The time windows can be adjusted according to each member's profile and value to the service provider. Generally, the computer program which sets the time windows is maintained in the invitation server 14.

Figure 5:
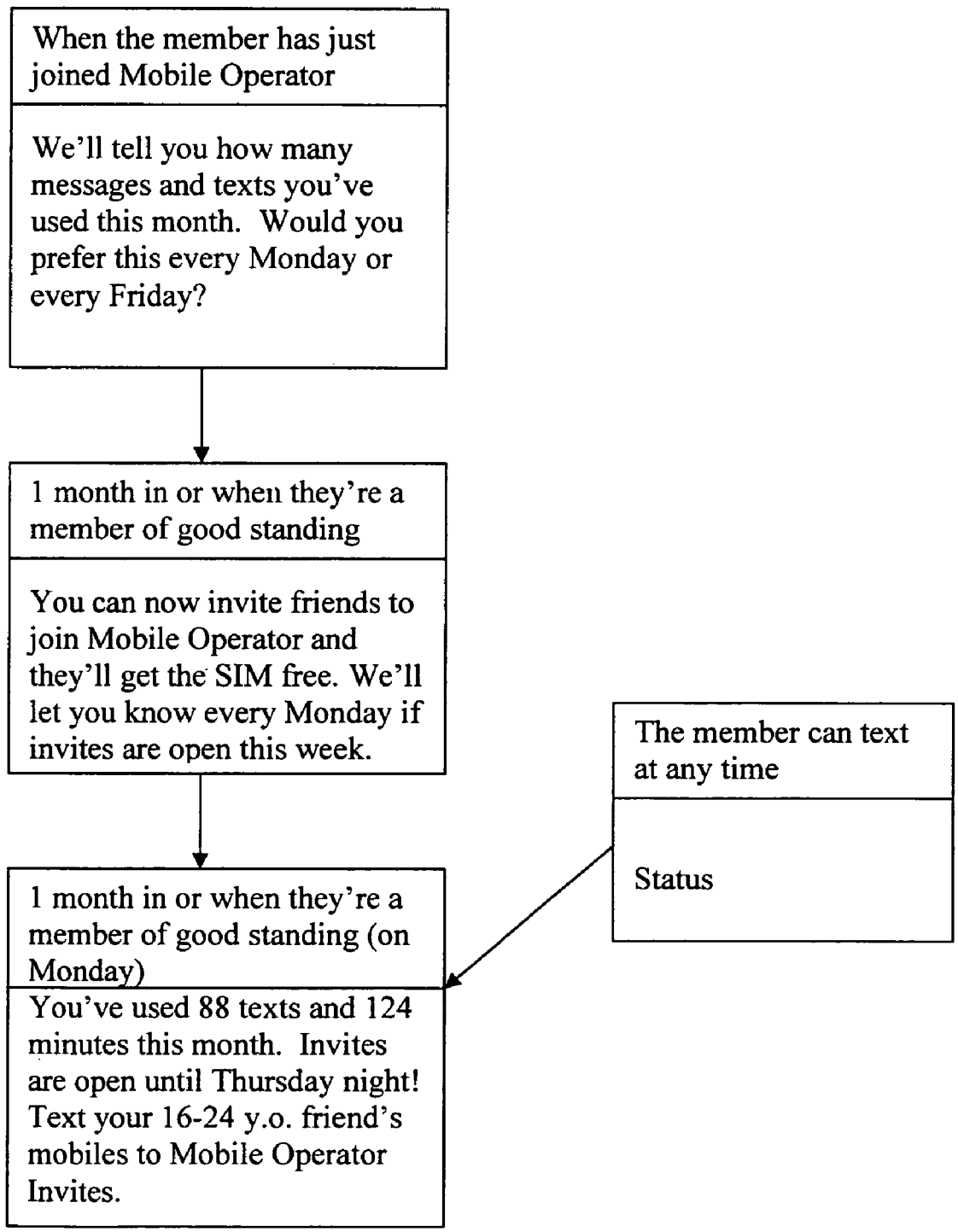
FIG. 5 is a schematic showing an exemplary manner in which a member of a mobile telephone service can be notified that they are able to invite others to join the service.
Figure 6A:
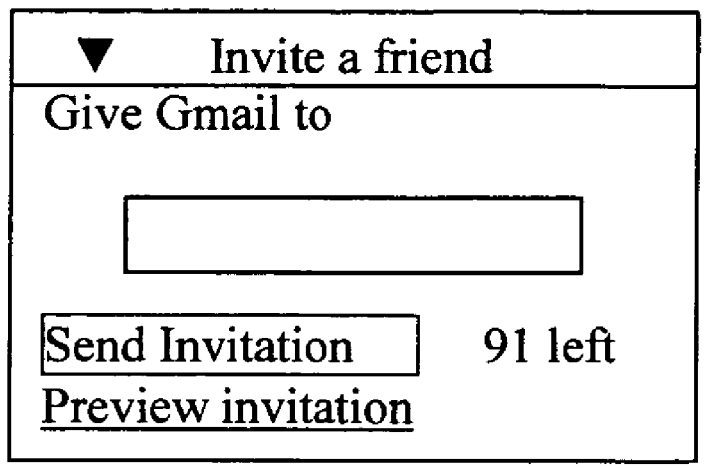
FIGS. 6A and 6B show prior art techniques for extending invitations or invites from one member of a virtual community, Gmail in this case, to a non-member to join the virtual community.
Figure 6B:
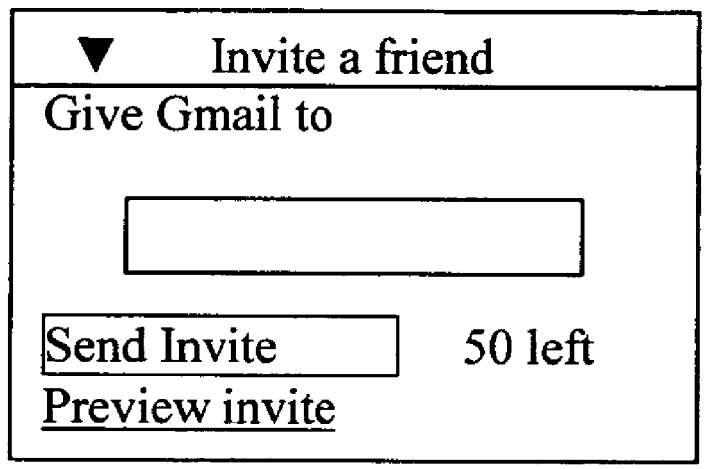

Referring now to FIG. 5, the invitation server 14 includes a computer software program which is arranged, among other things, to notify members if they are able to extend invitations to others to join the service. When a member initially joins the mobile service, the software program is arranged to enable the member to select when they want to be notified as to how many messages and texts they have used in the current month.

The following month, or whenever the computer program determines that they are a member in good standing, the member will be notified if and when they can invite others to join the service. This notification can be sent periodically, e.g., every week on a designated day such as Monday in the example shown in FIG. 5. On that day, when the member requests the status of their account via a text message, the member will be notified of their usage as to text messages and minutes, the possibility to invite others to join the service, their invitation history (how many invitations they have extended and how many active members they have caused to join the service) and the parameters of the time window for such invitations to be accepted. The time window may be set by the computer program to be, for example, a few days, a week, a few weeks, etc.

In addition to limiting the time window within which a member can extend an invitation, it is also possible to limit the number of invitations a member can extend within the time window. For example, a member can be notified that they can invite up to seven new members within seven days. The time windows and number of invitations can be determined based on, for example, a member's invitation history, the network capability, the availability of advertising, etc.

By linking a notification to a member of the possibility to invite others to join the service with notification of account information when requested by the member, the member does not receive unwanted messages from the service provider or operator as to the possibility of inviting others to join the service.

Rather, the member is notified that they can invite others to join the service only when account information is sought. This avoids a situation where messages about the possibility of inviting others to join the service are sent to members who do not have anyone to invite. Since such members may constitute a large portion of the members, the service is not unnecessarily burdened with extraneous messages. Moreover, in this manner, each member does not receive unnecessary and possibly annoying messages.

Exemplary embodiments of the methods and arrangements described above can maximize and increase the possibility of a non-member reviewing an invitation. Among other things, since the invitation is associated in some way with an individual or member of the network known to the non-member, the non-member would be more inclined to review the invitation. Indeed, in those embodiments wherein the known member is actually indicated as being the sender of the invitation, the problems arising from having an unknown third party indicated as the sender of the invitation, such as the non-member considering the invitation spam, junk or trash mail, or when the invitation is delivered over the Internet, possibly even notifying a service provider that the invitation is indicative of fraudulent use of the Internet, are reduced. These problems are substantially avoided when the unknown third party sends an invitation for the non-member to the member, and although this unknown (to the non-member) third party is seen or considered as the sender of the invitation, since the member shows the invitation to the non-member, e.g., from his or her mobile phone, the member would almost certainly review the invitation.

Thus, the invention provides a technique to link an invitation to apply to join or join a service to a member, a dealer or possibly a campaign initiated on behalf of the service provider or operator. In the latter case, the provider or operator would obtain subscriber numbers for non-members and send in a coordinated effort, invitations to target groups of subscribers. Linking invitations to the inviters enables tracking of the effectiveness of the invitation process.

Although the invitations may be created for and linked to specific invitees, i.e., based on information about these invitees provided to the invitation server, this link is not required and in some embodiments of the invention, the access code is not linked to the invitees.

Communications for any of the methods and arrangements described above may be coordinated by computer readable media. The computer readable media would coordinate communications between multiple users of one or more communication networks and a server on which the computer readable media may be resident.

To this end, implementing one of the invitation techniques described above, the computer readable media is capable of receiving a message from a first user belonging to a network coordinated by the computer readable media, the message providing identification information of a second user, sending to the first user a key to allow the second user to communicate with the server, and receiving a message from the second user using the key provided to the second user directly from the first user. The computer readable media is also capable of determining whether the key sent by the second user corresponds to the key provided by the server, and if so enabling communications between the second user and the server.

The computer readable media may also be capable of sending to the first user a message including the key and instructions as to how the second user can initiate communications with the server, and/or determining the origination of the message containing the key and whether the originator of the message corresponds to the second user in order to verify that the second user sent the key and only if so, enabling communications between the second user and the server. The computer readable media may also be capable of determining whether the first user is able to extend an invitation to the second user prior to sending to the first user a key to allow the second user to communicate with the server.

The foregoing description has focused primarily on an invitation from a member to a single non-member, which process may be repeated several times. It is also conceivable that a single member can extend invitations simultaneously to multiple non-members. This member, who may be a dealer or reseller of telecommunications devices, may be provided with the ability to trigger an invitation campaign to non-members and also be provided with an incentive to extend invitations, for example, based on results of previous invitations campaigns. Thus, the dealer's invitation history may be monitored by the invitation server and his or her ability to conduct future invitation campaigns based on those results.

The invention can be also used for distributing promotional messages such as advertisements using the logic of the invention. According to this embodiment the A-user would forward the advertisement messages to B-user creating greater trust for the advertisement message than if it would come directly from $3^{rd}$ party to B-user. Alternatively the invention can be used to distribute discount and special offer coupons to users.

In the context of this document, computer-readable medium could be any means that can contain, store, communicate, propagate or transmit a program for use by or in connection with the method, system, apparatus or device. The computer-readable medium can be, but is not limited to (not an exhaustive list), electronic, magnetic, optical, electromagnetic, infrared, or semi-conductor propagation medium. The medium can also be (not an exhaustive list) an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The medium can also be paper or other suitable medium upon which a program is printed, as the program can be electronically captured, via for example, optical scanning of the paper or other medium, then compiled, interpreted, or otherwise processed in a suitable manner, if necessary, and then stored in a computer memory.

Also, a computer program or data may be transferred to another computer-readable medium by any suitable process such as by scanning the computer-readable medium.

Having described exemplary embodiments of the invention with reference to the accompanying drawings, it will be appreciated that the present invention is not limited to those embodiments, and that various changes and modifications can be effected therein by one of ordinary skill in the art without departing from the scope or spirit of the invention as defined by the appended claims.

The invention claimed is:

1. A method for enabling communications between a network entity with which a first user is communicating via a communications network and a second user, the method comprising:
   sending a first message from a communications device associated with the first user to the network entity informing the network entity of identification information of the second user;
   sending, to the communications device associated with the first user, a key to enable the second user to communicate with the network entity; thereafter
   providing the key from the communications device associated with the first user directly to a communications device associated with the second user; thereafter
   sending a second message comprising the key from the telecommunications device associated with the second user to the network entity; thereafter
   using the identification information of the second user so as to determine whether the key sent from the communications device associated with the second user corresponds to the key provided by the network entity to the communications device associated with the first user; and if so
   enabling communications between the communications device associated with the second user and the network entity.

2. The method of claim 1, wherein the network entity is associated with a provider or operator of mobile telecommunications services, wherein the step of providing the key from the communications device associated with the first user directly to the communications device associated with the second user includes sending an invitation to apply for, to join a network using, or to accept, mobile telecommunications services from the provider or operator of the mobile telecommunications services, and the identification information of the second user is a subscriber number, MSISDN, or IMEI code of the second user to a telecommunications network.

3. The method of claim 2, wherein the first and second users have mobile telecommunications devices and the first and second users send and receive messages via their mobile telecommunications devices.

4. The method of claim 3, wherein the mobile telecommunications devices are selected from a group consisting of mobile telephones, multimedia computers, personal data assistants, laptop computers, and desktop computers.

5. The method of claim 3, wherein the mobile telecommunications devices have communication capabilities such as text, messaging, Wireless Application Protocol (WAP) browsing, World Wide Web (WEB) browsing, voice, audio and video communications.

6. The method of claim 5, wherein the network entity is a provider or operator of an Internet-based service, and the step of providing the key from the communications device associated with the first user directly to the communications device associated with the second user includes sending a message from the communications device associated with the first user to the communications device associated with the second user, said message being an invitation to receive the Internet-based service, wherein the identification information of the second user is an e-mail address.

7. The method of claim 4, wherein the network entity is a provider or operator of an Internet-based service, and the step of providing the key from the communications device associated with the first user directly to the communications device associated with the second user includes sending a message from the communications device associated with the first user to the communications device associated with the second user, said message being an invitation to receive the Internet-based service, wherein the identification information of the second user is an email address.

8. The method of claim 3, wherein the network entity is a provider or operator of an Internet-based service, and the step of providing the key from the communications device associated with the first user directly to the communications device associated with the second user includes sending a message from the communications device associated with the first user to the communications device associated with the second user, said message being an invitation to receive the Internet-based service, wherein the identification information of the second user is an e-mail address.

9. The method of claim 2, wherein the network entity is a provider or operator of an Internet-based service, and the step of providing the key from the communications device associated with the first user directly to the communications device associated with the second user includes sending a message from the communications device associated with the first user to the communications device associated with the second user, said message being an invitation to receive the Internet-based service, wherein the identification information of the second user is an email address.

10. The method of claim 1, wherein the network entity is a provider or operator of an Internet-based service, and the step of providing the key from the communications device associated with the first user directly to the communications device associated with the second user includes sending a message from the communications device associated with the first user to the communications device associated with the second user, said message being an invitation to receive the Internet-based service, wherein the identification information of the second user is an e-mail address.

11. The method of claim 10, wherein the step of sending from the network entity to the communications device associated with the first user a key to allow the second user to communicate with the network entity comprises sending from the network entity to the communications device associated with the first user a message including the key and instructions as to how the second user can initiate communications with the network entity.

12. The method of claim 3, wherein the step of sending from the network entity to the communications device associated with the first user a key to allow the second user to communicate with the network entity comprises sending from the network entity to the communications device associated with the first user a message including the key and instructions as to how the second user can initiate communications with the network entity.

13. The method of claim 2, wherein the step of sending from the network entity to the communications device associated with the first user a key to allow the second user to communicate with the network entity comprises sending from the network entity to the communications device associated with the first user a message including the key and instructions as to how the second user can initiate communications with the network entity.

14. The method of claim 1, wherein the step of sending from the network entity to the communications device associated with the first user a key to allow the second user to communicate with the network entity comprises sending from the network entity to the communications device associated with the first user a message including the key and instructions as to how the second user can initiate communications with the network entity.

15. The method of claim 14, wherein the step of providing the key from the communications device associated with the first user directly to the communications device associated with the second user comprises at least one of sending a short message service message to the communications device associated with the second user containing the key, sending instructions using e-mail including the key, calling the second user and informing the second user of the key, sending the key in a letter, or showing the second user the key directly from a device of the first user.

16. The method of claim 10, wherein the step of providing the key from the communications device associated with the first user directly to the communications device associated with the second user comprises at least one of sending a short message service message to the communications device associated with the second user containing the key, sending instructions using e-mail including the key, calling the second user and informing the second user of the key, sending the key in a letter, or showing the second user the key directly from a device of the first user.

17. The method of claim 3, wherein the step of providing the key from the communications device associated with the first user directly to the communications device associated with the second user comprises at least one of sending a short message service message to the communications device associated with the second user containing the key, sending instructions using e-mail including the key, calling the second user and informing the second user of the key, sending the key in a letter, or showing the second user the key directly from a device of the first user.

18. The method of claim 2, wherein the step of providing the key from the communications device associated with the first user directly to the communications device associated with the second user comprises at least one of sending a short message service message to the communications device associated with the second user containing the key, sending instructions using e-mail including the key, calling the second user and informing the second user of the key, sending the key in a letter, or showing the second user the key directly from a device of the first user.

19. The method of claim 1, wherein the step of providing the key from the communications device associated with the first user directly to the communications device associated with the second user comprises at least one of sending a short message service message to the communications device associated with the second user containing the key, sending instructions using e-mail including the key, calling the second user and informing the second user of the key, sending the key in a letter, or showing the second user the key directly from a device of the first user.

20. The method of claim 19, wherein the step of determining whether the key sent by the communications device associated with the second user corresponds to a key provided by the network entity comprises comparing the key sent by the second user to a database of keys maintained by the network entity.

21. The method of claim 14, wherein the step of determining whether the key sent by the communications device associated with the second user corresponds to a key provided by the network entity comprises comparing the key sent by the second user to a database of keys maintained by the network entity.

22. The method of claim 10, wherein the step of determining whether the key sent by the communications device associated with the second user corresponds to a key provided by the network entity comprises comparing the key sent by the second user to a database of keys maintained by the network entity.

23. The method of claim 3, wherein the step of determining whether the key sent by the communications device associated with the second user corresponds to a key provided by the network entity comprises comparing the key sent by the second user to a database of keys maintained by the network entity.

24. The method of claim 2, wherein the step of determining whether the key sent by the communications device associated with the second user corresponds to a key provided by the network entity comprises comparing the key sent by the second user to a database of keys maintained by the network entity.

25. The method of claim 1, wherein the step of determining whether the key sent by the communications device associated with the second user corresponds to a key provided by the network entity comprises comparing the key sent by the second user to a database of keys maintained by the network entity.

26. The method of claim 25, further comprising determining an originator of the message containing the key and determining whether the originator of the message corresponds to the second user in order to verify that the second user sent the key and only if so, enabling communications between the communications device associated with the second user and the network entity.

27. The method of claim 19, further comprising determining an originator of the message containing the key and determining whether the originator of the message corresponds to the second user in order to verify that the second user sent the key and only if so, enabling communications between the communications device associated with the second user and the network entity.

28. The method of claim 14, further comprising determining an originator of the message containing the key and determining whether the originator of the message corresponds to the second user in order to verify that the second user sent the key and only if so, enabling communications between the communications device associated with the second user and the network entity.

29. The method of claim 10, further comprising determining an originator of the message containing the key and determining whether the originator of the message corresponds to the second user in order to verify that the second user sent the key and only if so, enabling communications between the communications device associated with the second user and the network entity.

30. The method of claim 3, further comprising determining an originator of the message containing the key and determining whether the originator of the message corresponds to the second user in order to verify that the second user sent the key and only if so, enabling communications between the communications device associated with the second user and the network entity.

31. The method of claim 2, further comprising determining an originator of the message containing the key and determining whether the originator of the message corresponds to the second user in order to verify that the second user sent the key and only if so, enabling communications between the communications device associated with the second user and the network entity.

32. The method of claim 1, further comprising determining an originator of the message containing the key and determining whether the originator of the message corresponds to the second user in order to verify that the second user sent the key and only if so, enabling communications between the communications device associated with the second user and the network entity.

33. The method of claim 32, further comprising determining whether the first user is able to extend an invitation to the second user prior to sending from the network entity to the communications device associated with the first user a key to allow the second user to communicate with the network entity.

34. The method of claim 25, further comprising determining whether the first user is able to extend an invitation to the second user prior to sending from the network entity to the communications device associated with the first user a key to allow the second user to communicate with the network entity.

35. The method of claim 19, further comprising determining whether the first user is able to extend an invitation to the second user prior to sending from the network entity to the communications device associated with the first user a key to allow the second user to communicate with the network entity.

36. The method of claim 14, further comprising determining whether the first user is able to extend an invitation to the second user prior to sending from the network entity to the communications device associated with the first user a key to allow the second user to communicate with the network entity.

37. The method of claim 10, further comprising determining whether the first user is able to extend an invitation to the second user prior to sending from the network entity to the communications device associated with the first user a key to allow the second user to communicate with the network entity.

38. The method of claim 3, further comprising determining whether the first user is able to extend an invitation to the second user prior to sending from the network entity to the communications device associated with the first user a key to allow the second user to communicate with the network entity.

39. The method of claim 2, further comprising determining whether the first user is able to extend an invitation to the second user prior to sending from the network entity to the communications device associated with the first user a key to allow the second user to communicate with the network entity.

40. The method of claim 1, further comprising determining whether the first user is able to extend an invitation to the second user prior to sending from the network entity to the communications device associated with the first user a key to allow the second user to communicate with the network entity.

41. The method of claim 40, wherein when the first user is determined to be unable to extend an invitation to the second user, the method includes storing the first user's request to extend an invitation in a database and subsequently sending a notification message to the communications device associated with the first user so as to notify the first user when they are able to extend an invitation.

42. The method of claim 39, wherein when the first user is determined to be unable to extend an invitation to the second user, the method includes storing the first user's request to extend an invitation in a database and subsequently sending a notification message to the communications device associated with the first user so as to notify the first user when they are able to extend an invitation.

43. The method of claim 38, wherein when the first user is determined to be unable to extend an invitation to the second user, the method includes storing the first user's request to extend an invitation in a database and subsequently sending a notification message to the communications device associated with the first user so as to notify the first user when they are able to extend an invitation.

44. The method of claim 37, wherein when the first user is determined to be unable to extend an invitation to the second user, the method includes storing the first user's request to extend an invitation in a database and subsequently sending a notification message to the communications device associated with the first user so as to notify the first user when they are able to extend an invitation.

45. The method of claim 36, wherein when the first user is determined to be unable to extend an invitation to the second user, the method includes storing the first user's request to extend an invitation in a database and subsequently sending a notification message to the communications device associated with the first user so as to notify the first user when they are able to extend an invitation.

46. The method of claim 35, wherein when the first user is determined to be unable to extend an invitation to the second user, the method includes storing the first user's request to extend an invitation in a database and subsequently sending a notification message to the communications device associated with the first user so as to notify the first user when they are able to extend an invitation.

47. The method of claim 33, wherein when the first user is determined to be unable to extend an invitation to the second user, the method includes storing the first user's request to extend an invitation in a database and subsequently sending a notification message to the communications device associated with the first user so as to notify the first user when they are able to extend an invitation.

48. The method of claim 40, wherein the step of enabling communications between the communications device associated with the second user and the network entity comprises sending a message from the network entity to the communi-

49. The method of claim 32, wherein the step of enabling communications between the communications device associated with the second user and the network entity comprises sending a message from the network entity to the communications device associated with the second user indicating that the second user is now authorized to communicate with the network entity.

50. The method of claim 25, wherein the step of enabling communications between the communications device associated with the second user and the network entity comprises sending a message from the network entity to the communications device associated with the second user indicating that the second user is now authorized to communicate with the network entity.

51. The method of claim 19, wherein the step of enabling communications between the communications device associated with the second user and the network entity comprises sending a message from the network entity to the communications device associated with the second user indicating that the second user is now authorized to communicate with the network entity.

52. The method of claim 14, wherein the step of enabling communications between the communications device associated with the second user and the network entity comprises sending a message from the network entity to the communications device associated with the second user indicating that the second user is now authorized to communicate with the network entity.

53. The method of claim 10, wherein the step of enabling communications between the communications device associated with the second user and the network entity comprises sending a message from the network entity to the communications device associated with the second user indicating that the second user is now authorized to communicate with the network entity.

54. The method of claim 3, wherein the step of enabling communications between the communications device associated with the second user and the network entity comprises sending a message from the network entity to the communications device associated with the second user indicating that the second user is now authorized to communicate with the network entity.

55. The method of claim 2, wherein the step of enabling communications between the communications device associated with the second user and the network entity comprises sending a message from the network entity to the communications device associated with the second user indicating that the second user is now authorized to communicate with the network entity.

56. The method of claim 1, wherein the step of enabling communications between the communications device associated with the second user and the network entity comprises sending a message from the network entity to the communications device associated with the second user indicating that the second user is now authorized to communicate with the network entity.

57. The method of claim 1, wherein the network entity is an operator of a virtual or non-virtual community, and the step of providing the key from the communications device associated with the first user to the communications device associated with the second user includes issuing an invitation to join the virtual or non-virtual community.

58. The method of claim 1, wherein the network entity is an organizer of a marketing campaign, and the step of providing the key from the communications device associated with the first user to the communications device associated with the second user includes providing a message about a product or service which is a subject of the marketing campaign.

59. The method of claim 1, wherein the key is an access code, the message being sent from the communications device associated with the second user to the network entity including the access code.

60. The method of claim 1, wherein the key is a number providing access to the network entity, the message being sent from the communications device associated with the second user to the network entity being sent the number providing access to the network entity without any other code.

61. The method of claim 32, further comprising notifying the first user of a time window in which a message can be sent to the second communications device for extending an invitation to the second user when sending the first user the key to enable the second user to communicate with the network entity.

62. The method of claim 25, further comprising notifying the first user of a time window in which a message can be sent to the second communications device for extending an invitation to the second user when sending the first user the key to enable the second user to communicate with the network entity.

63. The method of claim 19, further comprising notifying the first user of a time window in which a message can be sent to the second communications device for extending an invitation to the second user when sending the first user the key to enable the second user to communicate with the network entity.

64. The method of claim 14, further comprising notifying the first user of a time window in which a message can be sent to the second communications device for extending an invitation to the second user when sending the first user the key to enable the second user to communicate with the network entity.

65. The method of claim 10, further comprising notifying the first user of a time window in which a message can be sent to the second communications device for extending an invitation to the second user when sending the first user the key to enable the second user to communicate with the network entity.

66. The method of claim 5, further comprising notifying the first user of a time window in which a message can be sent to the second communications device for extending an invitation to the second user when sending the first user the key to enable the second user to communicate with the network entity.

67. The method of claim 2, further comprising notifying the first user of a time window in which a message can be sent to the second communications device for extending an invitation to the second user when sending the first user the key to enable the second user to communicate with the network entity.

68. The method of claim 1, further comprising notifying the first user of a time window in which a message can be sent to the second communications device for extending an invitation to the second user when sending the first user the key to enable the second user to communicate with the network entity.

69. The method of claim 68, further comprising:
storing the first user's invitation history; and determining the time window based on the first user's invitation history.

70. The method of claim 67, further comprising:
 storing the first user's invitation history; and determining the time window based on the first user's invitation history.
71. The method of claim 65, further comprising:
 storing the first user's invitation history; and determining the time window based on the first user's invitation history.
72. The method of claim 64, further comprising:
 storing the first user's invitation history; and determining the time window based on the first user's invitation history.
73. An arrangement for enabling communications between a network entity with which a first user is communicating via a communications network and a second user, the arrangement comprising:
 a first communications device maintained by the first user for sending a first message to the network entity informing the network entity of identification information of the second user;
 a processing system maintained by the network entity for sending to the first user a second message containing a key to allow a communications device associated with the second user to communicate with the network entity;
 said first communications device maintained by the first user being arranged to send a third message directly to said communications device associated with the second user containing the key after receiving the second message from said processing system maintained by the network entity; and
 a second communications device maintained by the second user for sending a fourth message to the network entity, said fourth message containing the key;
 said processing system maintained by the network entity being arranged, on the basis of the identification of the second user provided by the first communications device, to determine whether the fourth message contains the same key provided by the network entity to the first communications device and if so enabling communications between said second communications device and said processing system maintained by the network entity.
74. The arrangement of claim 73, wherein the network entity is a provider or operator of mobile telecommunications services, the third message is an invitation to accept mobile telecommunications services from the provider or operator of mobile telecommunications services, and the identification information of the second user is a subscriber number of the second user to a telecommunications network.
75. The arrangement of claim 74, wherein said first and second communications devices are mobile telecommunications devices.
76. The arrangement of claim 75, wherein the network entity is a provider or operator of an Internet-based service, the third message is an invitation to receive the Internet-based service, and the identification information of the second user is an e-mail address.
77. The arrangement of claim 74, wherein the network entity is a provider or operator of an Internet-based service, the third message is an invitation to receive the Internet-based service, and the identification information of the second user is an e-mail address.
78. The arrangement of claim 73, wherein the network entity is a provider or operator of an Internet-based service, the third message is an invitation to receive the Internet-based service, and the identification information of the second user is an email address.

79. The arrangement of claim 78, wherein said processing system maintained by the network entity is arranged to send from the network entity to the first communications device a message including the key and instructions as to how the second user can initiate communications with the network entity.
80. The arrangement of claim 75, wherein said processing system maintained by the network entity is arranged to send from the network entity to the first communications device a message including the key and instructions as to how the second user can initiate communications with the network entity.
81. The arrangement of claim 74, wherein said processing system maintained by the network entity is arranged to send from the network entity to the first communications device a message including the key and instructions as to how the second user can initiate communications with the network entity.
82. The arrangement of claim 73, wherein said processing system maintained by the network entity is arranged to send from the network entity to the first communications device a message including the key and instructions as to how the second user can initiate communications with the network entity.
83. The arrangement of claim 82, wherein said first communications device is arranged to enable sending a short message service message to the second communications device containing the key, sending instructions using e-mail including the key, or calling the second user to inform the second user of the key.
84. The arrangement of claim 78, wherein said first communications device is arranged to enable sending a short message service message to the second communications device containing the key, sending instructions using e-mail including the key, or calling the second user to inform the second user of the key.
85. The arrangement of claim 75, wherein said first communications device is arranged to enable sending a short message service message to the second communications device containing the key, sending instructions using e-mail including the key, or calling the second user to inform the second user of the key.
86. The arrangement of claim 74, wherein said first communications device is arranged to enable sending a short message service message to the second communications device containing the key, sending instructions using e-mail including the key, or calling the second user to inform the second user of the key.
87. The arrangement of claim 73, wherein said first communications device is arranged to enable sending a short message service message to the second communications device containing the key, sending instructions using e-mail including the key, or calling the second user to inform the second user of the key.
88. The arrangement of claim 87, wherein said processing system maintained by the network entity is arranged to compare the key sent by the second communications device to a database of keys maintained by the network entity in order to determine whether the key in the fourth message corresponds to a key provided by the network entity.
89. The arrangement of claim 82, wherein said processing system maintained by the network entity is arranged to compare the key sent by the second communications device to a database of keys maintained by the network entity in order to determine whether the key in the fourth message corresponds to a key provided by the network entity.

90. The arrangement of claim 78, wherein said processing system maintained by the network entity is arranged to compare the key sent by the second communications device to a database of keys maintained by the network entity in order to determine whether the key in the fourth message corresponds to a key provided by the network entity.

91. The arrangement of claim 75, wherein said processing system maintained by the network entity is arranged to compare the key sent by the second communications device to a database of keys maintained by the network entity in order to determine whether the key in the fourth message corresponds to a key provided by the network entity.

92. The arrangement of claim 74, wherein said processing system maintained by the network entity is arranged to compare the key sent by the second communications device to a database of keys maintained by the network entity in order to determine whether the key in the fourth message corresponds to a key provided by the network entity.

93. The arrangement of claim 73, wherein said processing system maintained by the network entity is arranged to compare the key sent by the second communications device to a database of keys maintained by the network entity in order to determine whether the key in the fourth message corresponds to a key provided by the network entity.

94. The arrangement of claim 93, wherein said processing system maintained by the network entity is arranged to verify that the second user sent the key by determining an originator of the message containing the key and determining whether the originator of the message corresponds to the second user, and only if so, enable communications between the second user and the network entity.

95. The arrangement of claim 92, wherein said processing system maintained by the network entity is arranged to verify that the second user sent the key by determining an originator of the message containing the key and determining whether the originator of the message corresponds to the second user, and only if so, enable communications between the second user and the network entity.

96. The arrangement of claim 91, wherein said processing system maintained by the network entity is arranged to verify that the second user sent the key by determining an originator of the message containing the key and determining whether the originator of the message corresponds to the second user, and only if so, enable communications between the second user and the network entity.

97. The arrangement of claim 90, wherein said processing system maintained by the network entity is arranged to verify that the second user sent the key by determining an originator of the message containing the key and determining whether the originator of the message corresponds to the second user, and only if so, enable communications between the second user and the network entity.

98. The arrangement of claim 89, wherein said processing system maintained by the network entity is arranged to verify that the second user sent the key by determining an originator of the message containing the key and determining whether the originator of the message corresponds to the second user, and only if so, enable communications between the second user and the network entity.

99. The arrangement of claim 88, wherein said processing system maintained by the network entity is arranged to verify that the second user sent the key by determining an originator of the message containing the key and determining whether the originator of the message corresponds to the second user, and only if so, enable communications between the second user and the network entity.

100. The arrangement of claim 93, wherein said processing system maintained by the network entity arc is arranged to determine whether the first user is able to extend an invitation to the second user prior to sending to the first user a key to allow the second user to communicate with the network entity.

101. The arrangement of claim 75, wherein said processing system maintained by the network entity is arranged to determine whether the first user is able to extend an invitation to the second user prior to sending to the first user a key to allow the second user to communicate with the network entity.

102. The arrangement of claim 74, wherein said processing system maintained by the network entity is arranged to determine whether the first user is able to extend an invitation to the second user prior to sending to the first user a key to allow the second user to communicate with the network entity.

103. The arrangement of claim 73, wherein said processing system maintained by the network entity is arranged to determine whether the first user is able to extend an invitation to the second user prior to sending to the first user a key to allow the second user to communicate with the network entity.

104. The arrangement of claim 103, wherein when the first user is determined to be unable to extend an invitation to the second user, said processing system maintained by the network entity is arranged to store the first user's request to extend an invitation in a database and subsequently send a notification message to the first communications device when the first user is able to extend an invitation.

105. The arrangement of claim 102, wherein when the first user is determined to be unable to extend an invitation to the second user, said processing system maintained by the network entity is arranged to store the first user's request to extend an invitation in a database and subsequently send a notification message to the first communications device when the first user is able to extend an invitation.

106. The arrangement of claim 101, wherein when the first user is determined to be unable to extend an invitation to the second user, said processing system maintained by the network entity is arranged to store the first user's request to extend an invitation in a database and subsequently send a notification message to the first communications device when the first user is able to extend an invitation.

107. The arrangement of claim 100, wherein when the first user is determined to be unable to extend an invitation to the second user, said processing system maintained by the network entity is arranged to store the first user's request to extend an invitation in a database and subsequently send a notification message to the first communications device when the first user is able to extend an invitation.

108. The arrangement of claim 103, wherein said processing system maintained by the network entity is arranged to send a message to the second communications device indicating that the second user is now authorized to communicate with the network entity.

109. The arrangement of claim 93, wherein said processing system maintained by the network entity is arranged to send a message to the second communications device indicating that the second user is now authorized to communicate with the network entity.

110. The arrangement of claim 87, wherein said processing system maintained by the network entity is arranged to send a message to the second communications device indicating that the second user is now authorized to communicate with the network entity.

111. The arrangement of claim 82, wherein said processing system maintained by the network entity is arranged to send a message to the second communications device indicating that the second user is now authorized to communicate with the network entity.

112. The arrangement of claim 78, wherein said processing system maintained by the network entity is arranged to send a message to the second communications device indicating that the second user is now authorized to communicate with the network entity.

113. The arrangement of claim 75, wherein said processing system maintained by the network entity is arranged to send a message to the second communications device indicating that the second user is now authorized to communicate with the network entity.

114. The arrangement of claim 74, wherein said processing system maintained by the network entity is arranged to send a message to the second communications device indicating that the second user is now authorized to communicate with the network entity.

115. The arrangement of claim 73, wherein said processing system maintained by the network entity is arranged to send a message to the second communications device indicating that the second user is now authorized to communicate with the network entity.

116. The arrangement of claim 74, wherein the network entity is an operator of a virtual or non-virtual community, and the message from the first communications device to the second communications device is an invitation to the second user to join the virtual or non-virtual community.

117. The arrangement of claim 73, wherein the network entity is an operator of a virtual or non-virtual community, and the message from the first communications device to the second communications device is an invitation to the second user to join the virtual or non-virtual community.

118. The arrangement of claim 74, wherein the network entity is an organizer of a marketing campaign, and the message from the first communications device to the second communications device is a message about a product or service which is a subject of the marketing campaign.

119. The arrangement of claim 73, wherein the network entity is an organizer of a marketing campaign, and the message from the first communications device to the second communications device is a message about a product or service which is a subject of the marketing campaign.

120. The arrangement of claim 74, wherein the key is an access code, the message being sent from the second user to the network entity including the code.

121. The arrangement of claim 73, wherein the key is an access code, the message being sent from the second user to the network entity including the code.

122. The arrangement of claim 74, wherein the key is a number providing access to the network entity, the message being sent from the second user to the network entity being sent with the number providing access to the network entity without any other code.

123. The arrangement of claim 73, wherein the key is a number providing access to the network entity, the message being sent from the second user to the network entity being sent with the number providing access to the network entity without any other code.

124. The arrangement of claim 78, wherein said processing system maintained by the network entity is arranged to notify the first user of a time window in which a message can be sent to the second communications device for extending an invitation to the second user when sending the second message to the first user.

125. The arrangement of claim 75, wherein said processing system maintained by the network entity is arranged to notify the first user of a time window in which a message can be sent to the second communications device for extending an invitation to the second user when sending the second message to the first user.

126. The arrangement of claim 74, wherein said processing system maintained by the network entity is arranged to notify the first user of a time window in which a message can be sent to the second communications device for extending an invitation to the second user when sending the second message to the first user.

127. The arrangement of claim 73, wherein said processing system maintained by the network entity is arranged to notify the first user of a time window in which a message can be sent to the second communications device for extending an invitation to the second user when sending the second message to the first user.

128. The arrangement of claim 127, wherein said processing system maintained by the network entity are arranged to store the first user's invitation history and determine the time window based on the first user's invitation history.

129. The arrangement of claim 126, wherein said processing system maintained by the network entity are arranged to store the first user's invitation history and determine the time window based on the first user's invitation history.

130. The arrangement of claim 125, wherein said processing system maintained by the network entity are arranged to store the first user's invitation history and determine the time window based on the first user's invitation history.

131. The arrangement of claim 124, wherein said processing system maintained by the network entity are arranged to store the first user's invitation history and determine the time window based on the first user's invitation history.

132. An arrangement for enabling communications within a communications network between a network entity with which a first user is communicating via the communications network and a second user, comprising:
    a first telecommunications device maintained by the first user;
    a second telecommunications device maintained by the second user; and
    an invitation server for communicating with said first and second telecommunications devices and controlling access to the network entity,
    said first telecommunications device being arranged to send a first message to said invitation server providing information about said second telecommunications device,
    said invitation server being arranged to send a second message to said first telecommunications device when the first user is able to extend an invitation to the second user, the second message containing a key to allow the second user to communicate with the network entity,
    said first telecommunications device being arranged to send a third message to said second telecommunications device after receipt of the second message, the third message containing the key,
    said second telecommunications device being arranged to receive the third message from said first telecommunications device and enable communications with said invitation server using the key contained in the third message,
    wherein the invitation server is arranged to use the identification information of the second user so as to determine whether the key sent from the second telecommunications device corresponds to the key provided by the network entity to the first telecommunications device.

133. The arrangement of claim 132, wherein said invitation server includes a central processing unit and memory associated therewith having a computer program, at least one database for storing information about the first and second users and at least one input/output device for communicating with the communications network.

134. The arrangement of claim 133, wherein the information about said second telecommunications device is a subscriber number identifying the second telecommunications device to the communications network.

135. The arrangement of claim 132, wherein the information about said second telecommunications device is a subscriber number identifying the second telecommunications device to the communications network.

136. The arrangement of claim 135, wherein said invitation server determines a permitted time window for the first user to extend invitations to others and upon receipt of the first message from said first telecommunications device, the invitation server determines whether the first message is received within the permitted time window.

137. The arrangement of claim 134, wherein said invitation server determines a permitted time window for the first user to extend invitations to others and upon receipt of the first message from said first telecommunications device, the invitation server determines whether the first message is received within the permitted time window.

138. The arrangement of claim 133, wherein said invitation server determines a permitted time window for the first user to extend invitations to others and upon receipt of the first message from said first telecommunications device, the invitation server determines whether the first message is received within the permitted time window.

139. The arrangement of claim 132, wherein said invitation server determines a permitted time window for the first user to extend invitations to others and upon receipt of the first message from said first telecommunications device, the invitation server determines whether the first message is received within the permitted time window.

140. The arrangement of claim 135, wherein said invitation server is arranged to include in the second message instructions to enable the second user to initiate communications with said invitation server.

141. The arrangement of claim 134, wherein said invitation server is arranged to include in the second message instructions to enable the second user to initiate communications with said invitation server.

142. The arrangement of claim 133, wherein said invitation server is arranged to include in the second message instructions to enable the second user to initiate communications with said invitation server.

143. The arrangement of claim 132, wherein said invitation server is arranged to include in the second message instructions to enable the second user to initiate communications with said invitation server.

144. The arrangement of claim 143, wherein said invitation server is arranged to determine whether the key being used to send the fourth message to said invitation server corresponds to a key in a database associated with said invitation server and only if so, enabling communications between said second telecommunications device and said invitation server.

145. The arrangement of claim 135, wherein said invitation server is arranged to determine whether the key being used to send the fourth message to said invitation server corresponds to a key in a database associated with said invitation server and only if so, enabling communications between said second telecommunications device and said invitation server.

146. The arrangement of claim 134, wherein said invitation server is arranged to determine whether the key being used to send the fourth message to said invitation server corresponds to a key in a database associated with said invitation server and only if so, enabling communications between said second telecommunications device and said invitation server.

147. The arrangement of claim 133, wherein said invitation server is arranged to determine whether the key being used to send the fourth message to said invitation server corresponds to a key in a database associated with said invitation server and only if so, enabling communications between said second telecommunications device and said invitation server.

148. The arrangement of claim 132, wherein said invitation server is arranged to determine whether the key being used to send the fourth message to said invitation server corresponds to a key in a database associated with said invitation server and only if so, enabling communications between said second telecommunications device and said invitation server.

* * * * *

UNITED STATES PATENT AND TRADEMARK OFFICE
CERTIFICATE OF CORRECTION

PATENT NO. : 7,581,101 B2  Page 1 of 1
APPLICATION NO. : 12/079312
DATED : August 25, 2009
INVENTOR(S) : Marko Ahtisaari It is certified that error appears in the above-identified patent and that said Letters Patent is hereby corrected as shown below:

On the Title Page, page 1, column 1, insert below Item (60) Related U.S. Application Data as follows:

--(30) Foreign Application Priority Data

June 22, 2007  (GB)  ..................................... 0712281.5--

Signed and Sealed this

Twenty-seventh Day of October, 2009

David J. Kappos
*Director of the United States Patent and Trademark Office*